Oct. 24, 1961 R. M. DOLBY 3,005,869

CIRCUIT FOR CLIPPING AND REINSERTING REFORMED SYNC PULSES IN COMPOSITE VIDEO SIGNAL

Filed Jan. 28, 1957 7 Sheets-Sheet 1

INVENTOR
Ray M. Dolby

BY

Flehr and Swain
ATTORNEYS

INVENTOR
Ray M. Dolby

BY

Flehr and Swain
ATTORNEYS

INVENTOR
Ray M. Dolby
BY
Flehr and Swain
ATTORNEYS

Oct. 24, 1961 R. M. DOLBY 3,005,869

CIRCUIT FOR CLIPPING AND REINSERTING REFORMED SYNC PULSES IN COMPOSITE VIDEO SIGNAL

Filed Jan. 28, 1957 7 Sheets-Sheet 4

INVENTOR
Ray M. Dolby

BY

Fisher and Swain

ATTORNEYS

INVENTOR
Ray M. Dolby
BY
Fisher and Brown
ATTORNEYS

Oct. 24, 1961 R. M. DOLBY 3,005,869

CIRCUIT FOR CLIPPING AND REINSERTING REFORMED SYNC PULSES IN COMPOSITE VIDEO SIGNAL

Filed Jan. 28, 1957 7 Sheets-Sheet 6

INVENTOR
Ray M. Dolby

BY

Flehr and Swain
ATTORNEYS

INVENTOR
Ray M. Dolby
BY
Flehr & Swain
ATTORNEYS

United States Patent Office 3,005,869

Patented Oct. 24, 1961

3,005,869

CIRCUIT FOR CLIPPING AND REINSERTING REFORMED SYNC PULSES IN COMPOSITE VIDEO SIGNAL

Ray M. Dolby, Cupertino, Calif., assignor to Ampex Corporation, Redwood City, Calif., a corporation of California Filed Jan. 28, 1957, Ser. No. 636,536
4 Claims. (Cl. 178—7.1)

This invention relates generally to systems and methods for recording and reproducing video or similar wide frequency band composite signals. Also it pertains to amplifying networks for processing a composite video signal.

Present U.S. standard television practice employs a composite video signal including the video frequency components together with horizontal and vertical synchronizing and equalizing pulses. As disclosed in copending applications Serial Nos. 427,138 filed May 3, 1954, issued as Patent 2,916,546; 506,182 filed May 5, 1955, issued as Patent 2,916,547; 506,552 filed May 6, 1955, issued as Patent 2,866,012; 524,004 filed July 25, 1955, issued as Patent 2,956,114; 552,868 filed December 13, 1955, issued as Patent 2,921,990; and 614,420 filed October 8, 1956 issued as Patent 2,968,692, such a composite signal can be recorded magnetically, and the stored record thereafter reproduced to form the desired image. In general the system disclosed in said applications employs a relatively wide magnetic tape together with a rotating head assembly having a plurality of circumferentially spaced transducer units (e.g. magnetic head units) which sweep successively across the tape, as the tape is driven lengthwise. Margins of the tape may be erased to receive sound and speed control or like recordings. The remaining laterally extending track portions are of such a length that an end part of one track at one edge of the tape contains recording which is duplicated in the end part of the next track, at the other tape edge. For reproduction the same or a similar head assembly is employed, together with the same or similar tape transport means. Proper synchronization and speed control is maintained whereby the head units sweep over the recorded tracks, with one unit commencing its scan over a track portion before the preceding scan has been completed. Switching (see said applications 427,138 and 614,420) is employed whereby the outputs of the head units are combined with elimination of duplicate information. The inherent characteristics of such a system may cause serious noise pulses or spikes in the video and other portions of the signal. Such noise components can be attributed to various causes, including momentary drop-outs and switching. They are objectionable for several reasons, including the fact that they tend to cause a poor signal to noise ratio for the system, and because a signal having such noise components is not well suited for application to a standard television transmitter, or standard monitor receiver.

Recording by the use of a modulated carrier frequency, and particularly a special form of FM carrier recording, has been found desirable. In accordance with the system and method disclosed and claimed in said copending application 524,004, special FM carrier recording is employed, with a carrier frequency near the upper limit of the video frequencies being recorded. For example, a center carrier frequency of 4.5 megacycles is employed, for effectively recording video frequencies up to about 4.0 megacycles. Each transducer unit may have a speed of movement relative to the tape of the order of 1500 inches per second, whereby, with available tapes and magnetic head units, a frequency of about 5.0 megacycles is the upper limit which can be effectively recorded. If a carrier frequency of 4.5 megacycles is utilized, for frequencies above about 3.5 megacycles, there is a gradual fall-off in effective recording. Such a system can be referred to as vestigial side band FM recording with the carrier frequency located in the upper end of the spectrum which the system is capable of handling. Where $\Delta f$ represents frequency deviation corresponding to maximum signal amplitude and $f_m$ represents the highest modulating frequency, the ratio of $\Delta f/f_m$ is relatively small, and in practice, using the values mentioned in the preceding example, can be of the order of 0.1 or 0.2.

When a frequency modulated composite video signal is recorded on magnetic tape in the manner previously described, and thereafter transduced and demodulated to produce a reproduced composite signal, certain undesirable frequency components due to the carrier are present in addition to the noise components previously mentioned. Such frequency components appear particularly on the blanking pedestals and synchronizing pulses. Standard television transmitters are generally provided with amplifying networks (i.e. stabilizing amplifiers) which reform the composite wave with respect to the shape of the synchronizing pulses, and which also apply clamping for D.C. restoration. When a composite video signal is applied to such an amplifying network from a magnetic recording and reproducing system of the type previously described, noise components present tend to cause undesirable clamping in the video portion of the wave, with the result that substantial portions of the desired video signal may be clamped improperly, whereby the reproduced image is distorted. In addition, assuming use of special FM recording as described above, the frequency components present on both the front and back porches of the blanking pedestals and on the horizontal synchronizing pulses of the composite signal, are not completely removed, and tend to interfere with horizontal and vertical synchronizing functions.

In view of the foregoing, it is the general object of the invention to provide a system and method for recording and reproducing composite video or similar wide frequency band signals, which will provide a good quality composite output signal, suitable for handling in normal manner by the electronics of a television transmitter.

Another object of the invention is to provide a system and method of the above character which utilizes FM recording, and which eliminates undesirable frequency components derived from the carrier frequency in the final composite output.

Another object of the invention is to provide a novel amplifier network for the processing of a composite video signal which will provide an output signal having reformed synchronizing pulses, together with noise free blanking pedestals.

Another object of the invention is to provide a processing amplifier network having a latitude of adjustment with respect to certain critical factors, including the form of the blanking pulses.

Another object of the invention is to provide novel amplifier networks for separately generating pulses for gating operations to control addition of vertical and horizontal synchronizing pulses to the signal.

Additional objects and features of the invention will appear from the following description in which the preferred embodiments have been set forth in detail in conjunction with the accompanying drawing.

Referring to the drawing.

Figure 6:
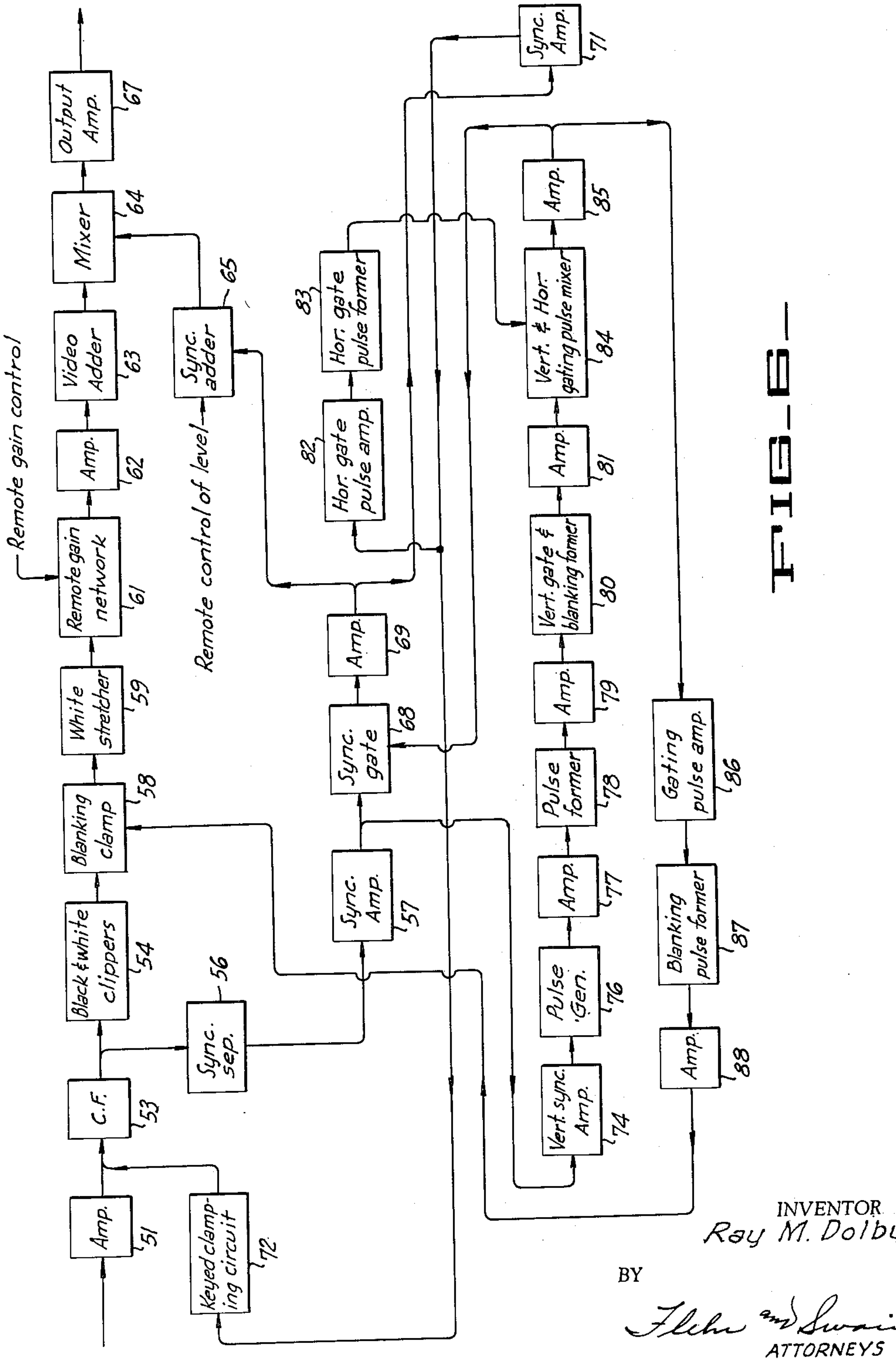
FIGURE 6 is a block diagram illustrating a more complete system for carrying out the invention and which utilizes the combined method of FIGURE 5.

FIGURES 9A to 9F inclusive, and 10A to 10F inclusive are wave forms serving to facilitate explanation of FIGURE 6.

Figure 7:
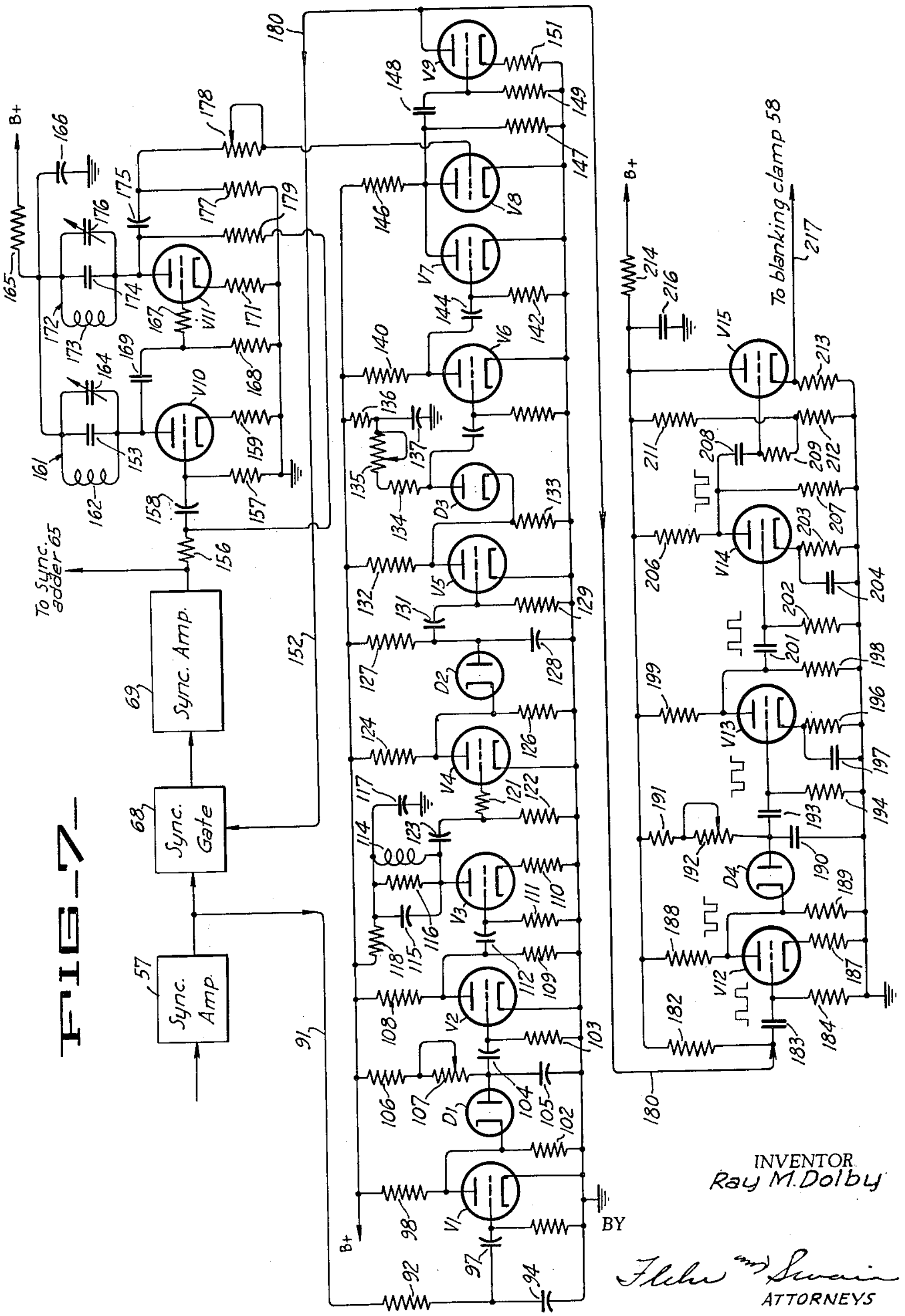
FIGURE 7 is a circuit diagram illustrating suitable circuitry for certain parts of FIGURE 6, including particularly the network for forming horizontal and vertical gating pulses.
Figure 8:
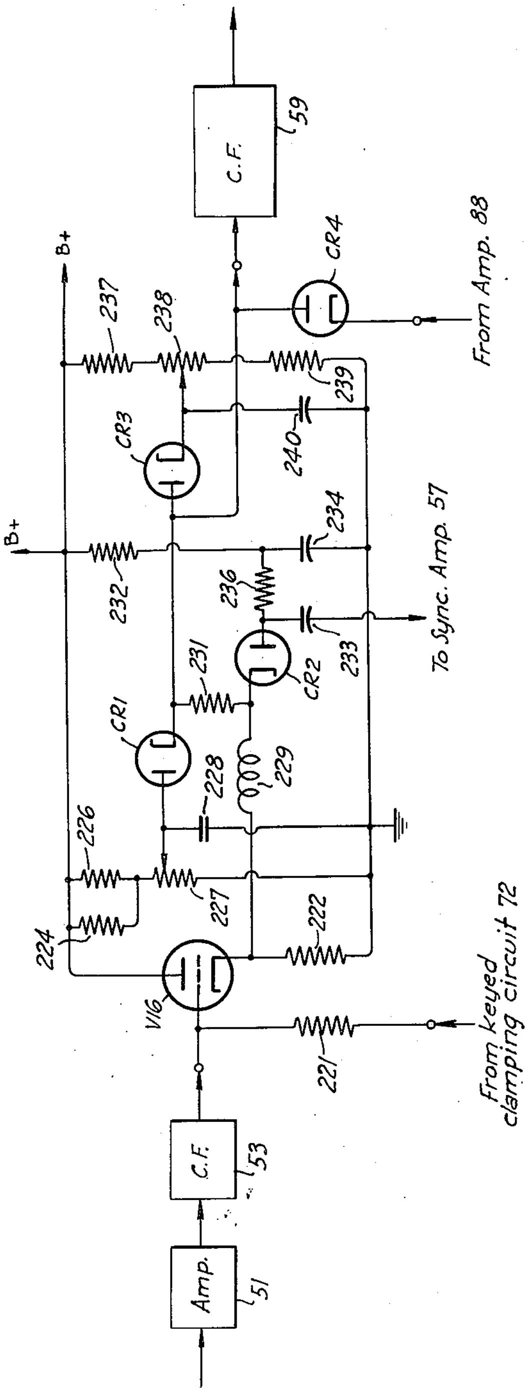
FIGURE 8 is a diagram illustrating suitable circuitry for the blanking of the signal.

FIGURES 11A to 11J inclusive, FIGURES 12A to 12E inclusive, and FIGURES 13A to 13D inclusive, are wave forms serving to facilitate an explanation of the over-all system, including particularly the detail circuitry of FIGURES 7 and 8.

Figure 1:
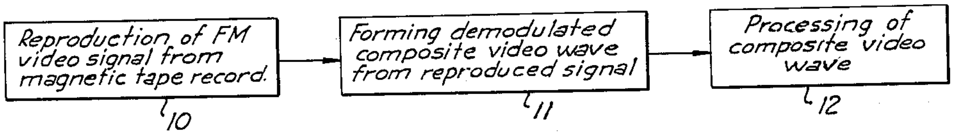
FIGURE 1 is a block diagram illustrating the general method employed in connection with the present invention.

FIGURE 1 schematically illustrates the general steps employed in connection with the present invention. Block 10 represents reproduction of FM video signal from a magnetic tape record of the type previously described. Block 11 represents forming a demodulated composite video wave from the reproduced signal portions. Block 12 represents the processing of the video wave, thereby providing a processed wave which is acceptable for rebroadcasting or retransmission.

Figure 2:
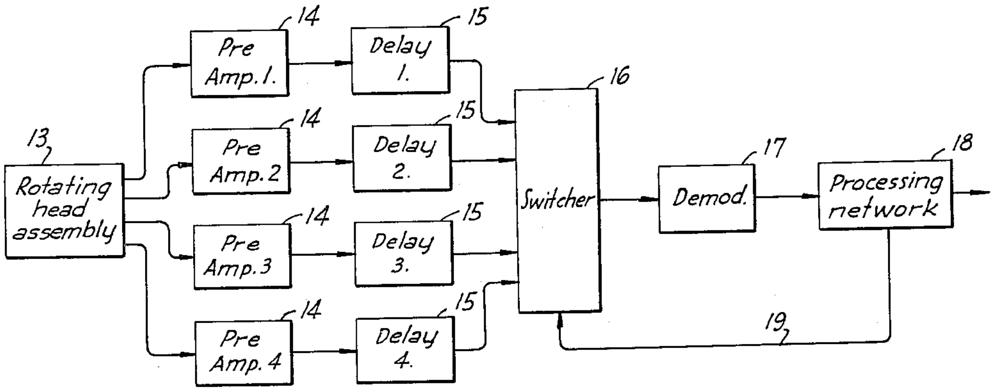
FIGURE 2 is a block diagram illustrating equipment for carrying out the method of FIGURE 1.

FIGURE 2 is a block diagram illustrating the equipment employed. The rotary head assembly 13 and associated tape transport means are constructed in the manner previously described, and disclosed in the aforementioned copending applications. The outputs from the separate transducer or head units (four in this instance) are applied to the several preamplifiers 14, and from thence through the adjustable delay lines 15 to the switcher 16. The switcher makes possible a single output signal from the separate signal portions received from the heads and the delay lines 15. The FM demodulator 17 produces a composite demodulated signal from the output of the switcher, and applies it to the processing network 18, where processing operations are performed as will be presently described in detail. Line 19 represents application of horizontal synchronizing pulses from the processing network to the switching means 16, to control the switching time whereby it coincides with a blanking interval (see application 614,420).

Figure 3:
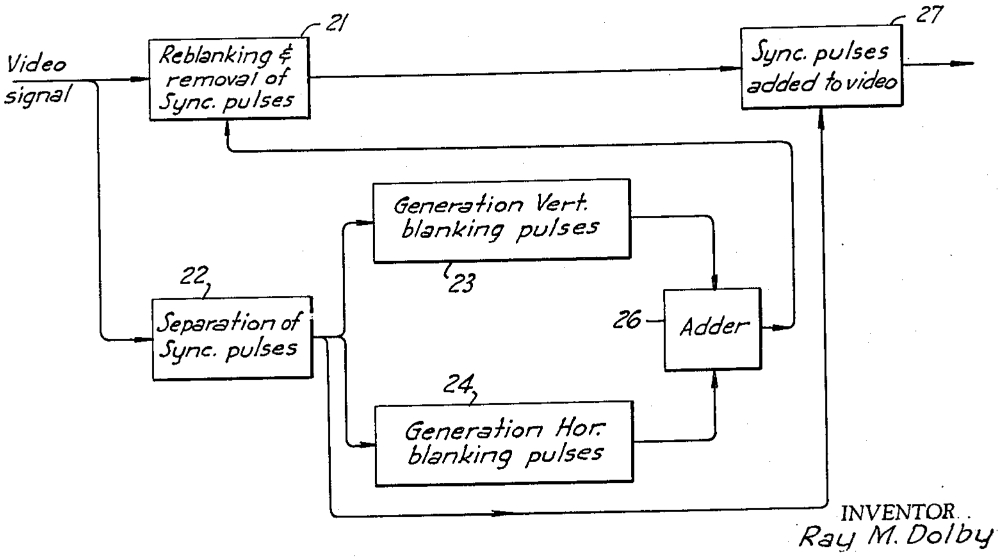
FIGURE 3 is a block diagram illustrating the method for carrying out the reblanking feature of the invention, if only this feature is desired.
Figure 4:
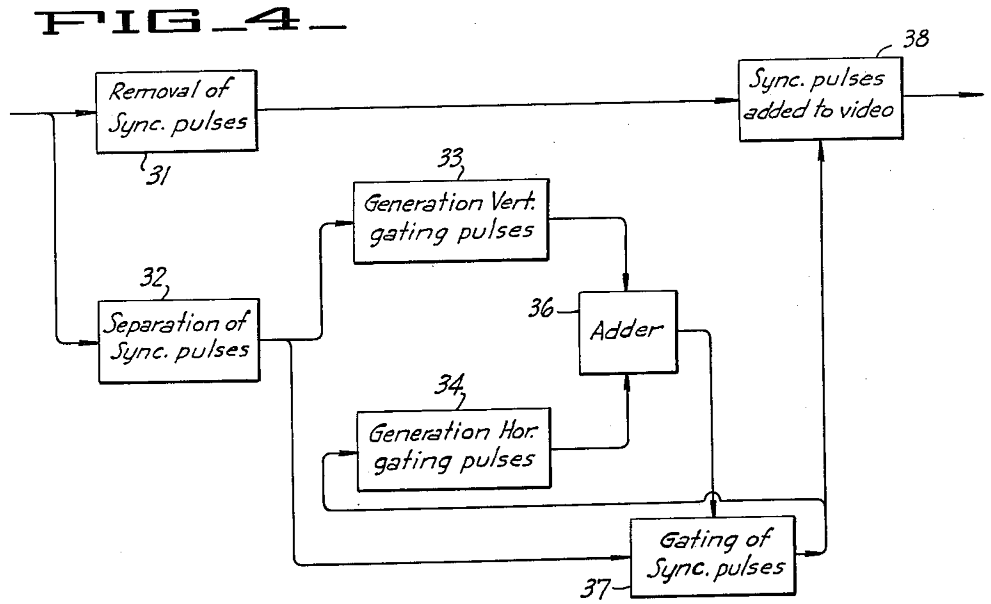
FIGURE 4 is a block diagram illustrating the method employed in connection with the synchronizing pulse gating feature of the invention.
Figure 5:
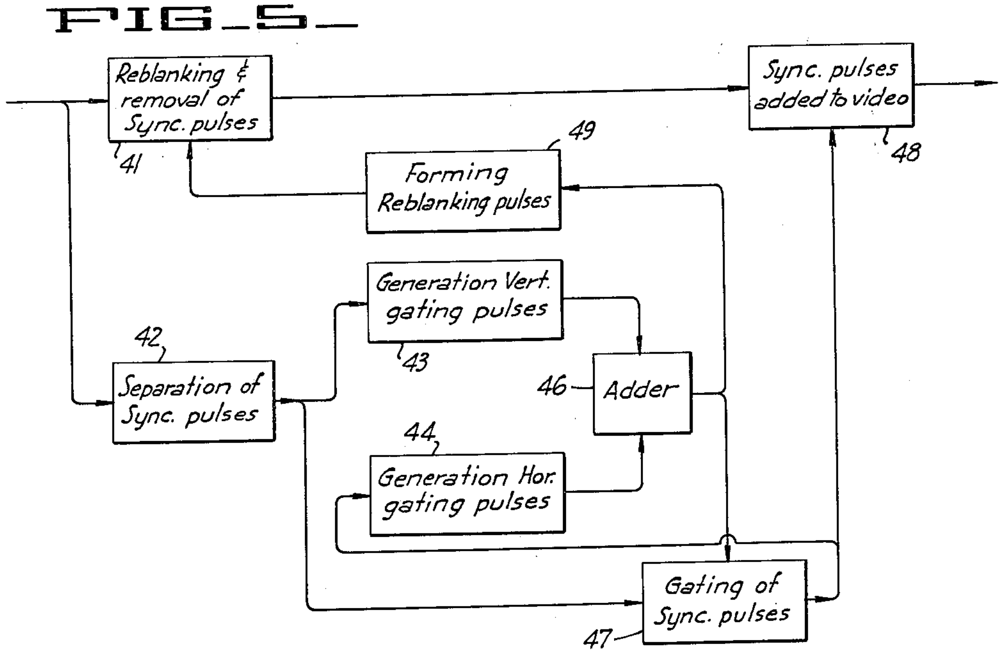
FIGURE 5 is a block diagram illustrating the combination of both reblanking and gating features as employed in the preferred embodiment of the invention.

The various processing operations performed by the network 18 can best be understood by reference to the block diagrams FIGURES 3, 4 and 5. FIGURE 3 represents the method employed for reblanking and FIGURE 4 the synchronizing pulse gating feature. FIGURE 5 shows combined reblanking and gating features as employed in the preferred embodiment of the invention. Referring first to FIGURE 3, the composite signal from the demodulator 17 is shown being subjected at 21 to reblanking of the pedestals and removal of synchronizing pulses. Block 22 represents the separation of synchronizing pulses from the composite wave, with generation of vertical blanking pulses at 23, and the generation of horizontal blanking pulses at 24. Generated vertical and horizontal blanking pulses are mixed or added at 26, and the output applied to 21 for blanking. The reblanked signal, without synchronizing pulses, has synchronizing pulses applied to the same at 27. Thus producing a processed composite signal.

In the method represented by FIGURE 4, the composite video wave from 17 has synchronizing pulses removed at 31, and synchronizing pulses are separated out at 32. In operation 33 vertical gating pulses are generated and the output of the synchronizing pulse gate 37 controls the generation of horizontal gating pulses in operation 34. The two sets of gating pulses are added or mixed at 36, and used for controlling the gating operation 37. This gating operation passes pulses from operation 32, and applies them to the wave at 38, thus producing a composite video wave.

In the combined method of FIGURE 5, the composite video signal from 17 is applied to operation 41 where it is subjected to reblanking and removal of synchronizing pulses. Synchronizing pulses are separated from the incoming composite wave at 42, and from the separated pulses vertical gating pulses are generated at 43. Horizontal gating pulses are generated at 44, and controlled by synchronizing pulses from the gating operation 47. These pulses are added at 46, and the combined pulses applied to the gating operation 47, thereby controlling (by gating) application of pulses from 42 to operation 48, where synchronizing pulses are added to the composite signal. Also pulses from the adder 46 are used for forming reblanking pulses at 49, and such pulses are used in operation 41 for reblanking the composite wave.

FIGURE 6 is a block diagram illustrating a complete network for carrying out the operations of FIGURE 5. The incoming composite video signal is applied to the multi-stage vacuum tube amplifier 51, and clamping means 72 is applied for D.C. restoration. Cathode follower 53 applies the output from amplifier 51 to the clippers 54, which clip with respect to both black and white portions of the video signal. Separator 56 separates synchronizing pulses from the output of cathode follower 53, and applies them to the synchronizing pulse amplifier 57. The output from clipper 54 is applied to the blanking clamp 58, which performs the blanking operation 41 of FIGURE 5. Preferably special clipping and blanking means are employed, as will be subsequently described, which makes possible effective blanking with maintenance of a desired amount of set-up. The blanked signal from 58 is applied to the white stretcher 59, which serves to expand or stretch the white portion of the video signal, thus compensating for compression which tends to take place in other parts of the system. From stretcher 59 the video signal may be passed through the remote gain network 61, which can be provided for convenience to facilitate adjustment of the gain from a remote point. Application of a remote controlling voltage is indicated. Amplifier 62 applies the amplified signal to the video adder 63, the output of which is added in mixer 64 to the output of the synchronizing pulse adder 65. The resulting reprocessed composite video signal is then applied to the output amplifier 67.

The separated synchronizing pulses from 56 are amplified at 57 and applied to the synchronizing pulse gate 68 of the electronic type. This gate performs the gating operation 47 of FIGURE 5. Amplifier 69 amplifies the clean pulses and applies them to the synchronizing pulse adder 65, and also to the synchronizing pulse amplifier 71. The keyed clamping circuit 72 receives synchronizing pulses from 71, and employs such pulses for D.C. restoration. Amplifier 74 is selective to the vertical synchronizing pulses, and receives amplified pulses from 57. The pulses from the output of amplifier 74 are applied through a series of pulse generators and amplifiers 76–81. These devices perform pulse generating operations to provide precise vertical gating pulses.

Clean horizontal synchronizing pulses from the synchronizing pulse amplifier 71 are applied to the horizontal gate oscillator 82 to lock in the same, and the output from 82 is applied to the pulse former 83. Both horizontal gating pulses (from 83) and vertical gating pulses (from amplifier 81) are mixed in the vertical and horizontal gating pulse mixer 84, and applied to amplifier 85, the output of which provides gating pulses for the gate 68. Vertical and horizontal gating pulses are also applied to the blanking clamp 58, by way of the gating pulse amplifier 86, the blanking pulse former 87 and amplifier 88.

Operation of the system shown in FIGURE 6 is as follows: The composite video signal is amplified at 51 and subjected to D.C. restoration by the keyed clamping circuit 72. The black and white clippers 54 serve to limit noise spikes beyond predetermined black and white limits. Blanking occurs at 58 to reform the blanking pedestals, and to remove undesired noise and frequency components. As will be explained by reference to FIGURE 8, this is done without loss of set-up and, in fact, this circuitry may be used to insert additional set-up. The white portion of the video signal is expanded or stretched at 59 to compensate for compression that may occur in other parts of the complete system. Precisely formed horizontal, vertical and equalizing pulses are added to the blanked video signal at 64. Clean pulses derived from the synchronizing pulses of the incoming composite video signal are used for the keyed clamping circuit, with the result that D.C. restoration is more accurately controlled without introducing undesired noise components. Also clean and accurately formed pulses, likewise derived from the synchronizing pulses, are applied to the blanking clamp 58. Thus synchronizing pulses derived from the incoming composite signal by the synchronizer pulse stripper or separator 56, are applied at 57 and applied to amplifier 69, after passing through the pulse controlled gate 68. The gate 68 effectively blocks all undesired noise or frequency components which may be present in the output of amplifier 57, except when the gate is on. The clean synchronizing pulses from amplifier 69 are applied to the keyed clamping circuit 72. The pulses applied to the blanking clamp 58 comprise both precisely formed horizontal and vertical blanking pulses. Thus precisely formed vertical gating pulses are derived by 74–81 from the output of amplifier 57. The horizontal pulses are supplied from the pulse former 83 and likewise are derived from the output of amplifier 57. The amplifiers and formers 86–88 supply blanking pulses to the clamp 58.

It will be evident from the foregoing that the complete system of FIGURE 6 carries out the combined method described above with reference to FIGURE 5.

Figure 9:
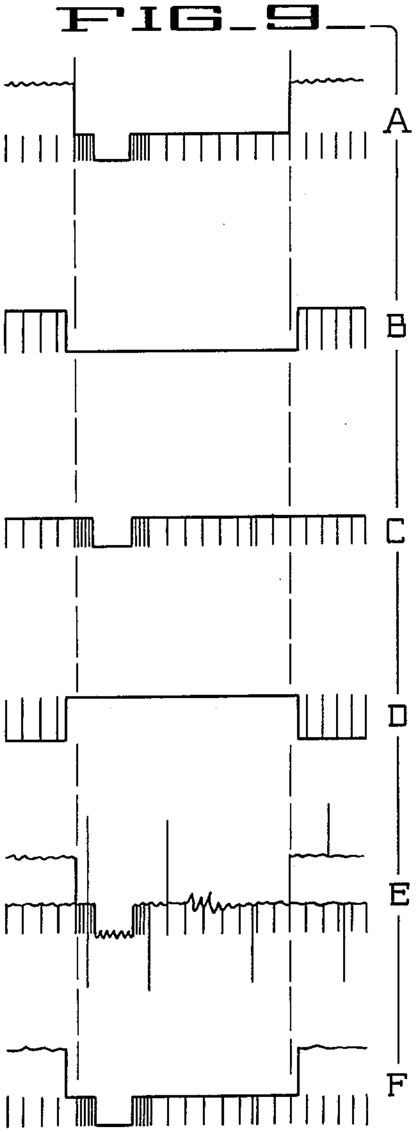

The wave forms of FIGURES 9A to 9F inclusive, and FIGURES 10A to 10F inclusive, facilitate and understanding of the methods and systems previously described. FIGURE 9E represents the vertical blanking portion of a demodulated composite video signal resulting from the playback of a magnetic tape record that has been made by the use of the special FM recording, and the special rotary head type of recording equipment previously described. Particularly it includes one vertical synchronizing pulse. Note the extended noise spikes in the video, blanking pedestal and synchronizing pulse portions of the wave form, and the frequency components superposed on the blanking pedestal and synchronizing pulse, derived from the original carrier. This is a typical signal of the type applied to the input of amplifier 51. FIGURE 9A shows an ideal signal. FIGURE 9B represents blanking the incoming video signal in step 41 of FIGURE 5, or in the blanking clamp 58 of FIGURE 6. Blanking commences just before the equalizing pulses and continues throughout the interval of the vertical synchronizing pulse. It is discontinued at or near the resumption of the video signal. FIGURE 9C represents the signal applied from operation 42 of FIGURE 5, to the gating operation 47. FIGURE 9D represents the gating signal, positive corresponding to "on," the vertical pulse commencing shortly before the equalizing pulses approach, whereby all information is permitted to pass until this vertical blanking period terminates. FIGURE 9F represents the output composite video signal, after processing has been completed. Note that the noise spikes have been removed or limited as to amplitude, and that frequency components derived from the carrier are no longer present.

Figure 10:
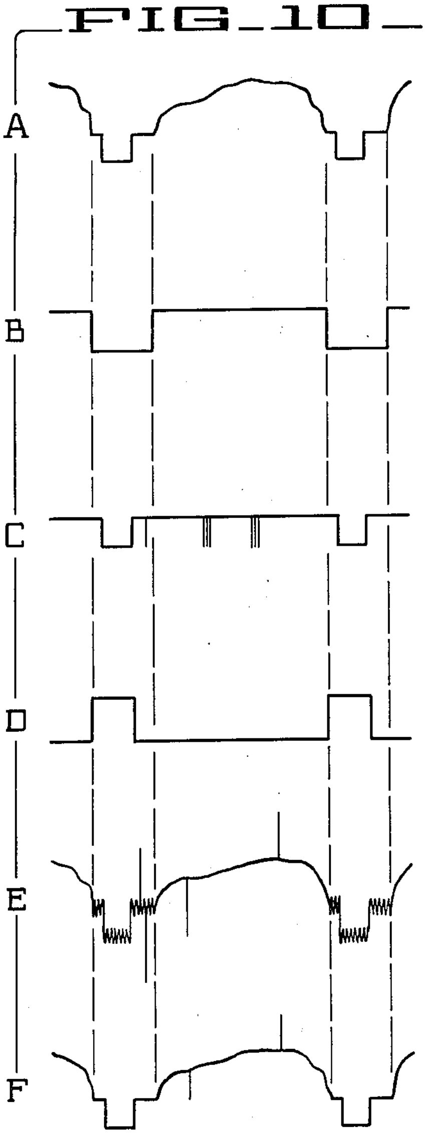

FIGURE 10E represents a demodulated composite video signal as applied to the input of amplifier 51, and is similar to FIGURE 9E except that it is to a smaller scale to show two adjacent horizontal synchronizing pulses. Again note the extended noise spikes in both the video and blanking pedestal portions of the wave. FIGURE 10A represents the same wave form as FIGURE 10E but without the noise spikes and interfering frequencies. FIGURE 10B represents horizontal blanking in operation 41, or by the blanking clamp 58 of FIGURE 6. FIGURE 10C represents the separated horizontal synchronizing pulses, or in other words the horizontal pulses as they appear in the output of amplifier 57. FIGURE 10D represents horizontal gating pulses applied to the gating operation 47 of FIGURE 5, or as applied to the gate 68 of FIGURE 6. FIGURE 10F represents a composite video output signal, after complete processing. Note that the noise spikes in the video portion of the wave have been limited by clipping, and that both noise components and superposed frequency components derived from the original carrier, have been completely eliminated from the horizontal synchronizing pulses and the associated blanking pedestals. The synchronizing gating pulses begin at the same time that blanking begins, and end shortly (e.g. one microsecond) after the horizontal synchronizing pulse has passed through the gate. This serves to eliminate noise components on the back porch of the blanking pedestal and between the synchronizing pulses.

FIGURE 7 illustrates suitable circuitry for certain portions of the system of FIGURE 6. That portion of the circuitry incorporating vacuum tubes V1–V9 corresponds to the devices numbered 74–85 inclusive of FIGURE 6. That part of the circuitry including vacuum tubes V10 and V11 corresponds to the devices 82 and 83 of FIGURE 6. The circuitry including tubes V12–V15 corresponds to the devices 86–88 of FIGURE 6. Component parts of this circuitry have been given designated numerals to facilitate identification. The manner in which the components are connected is self evident.

By way of example, in one particular instance, the vacuum tubes V1–V9 inclusive were all of the type known by manufacturers' specifications as number 12AT7. Tubes D1, D2 and D3 were vacuum tube diodes, known by manufacturers' specifications as number 6AL5. The various resistors and condensers in the circuitry including tubes V1 to V9 inclusive had values as follows: Resistor 92, 33k (k=1000 ohms); capacitor 94, 0.002 mf.; coupling capacitor 97, 0.02 mf.; plate resistor 98 for tube V1, 22k; cathode resistor 102 for diode D1, 22k; fixed and adjustable series connected resistors 106 and 107, 470k and a maximum of 1 megohm respectively; capacitor 105, 0.002 mf.; coupling condenser 104, 0.02 mf.; grid resistor 103 for tube V1, 4.7 megohms; grid resistor 108 for tube V2, 22k; resistor 109, 22k; coupling condenser 112, 0.02 mf.; grid resistor 111 for tube V3, 4.7 megohms; cathode biasing resistor 110, 220 ohms; resistor 118, 2.7k; resistor 116, 10k; capacitor 115, 0.25 mf.; inductance 114, 100 mh.; capacitor 123, 0.02 mf.; condenser 117, 20 mf.; resistor 121, 33k; resistor 122, 10 megohms; plate resistor 124 for tube V4, 22k; resistor 126, 22k; resistor 127, 3.3 megohms; capacitor 131, 0.1 mf.; capacitor 128, 0.2 mf.; resistor 129, 10 megohms; plate resistor 132 for tube V5, 22k; resistor 133, 22k; fixed resistor 134, adjustable resistor 135, and fixed resistor 136, 22k; maximum 100k and 4.7 megohms respectively; capacitor 137, 0.25 mf.; grid resistor 140 for tube V6, 22k; capacitor 144, 0.1 mf.; resistor 142, 4.7 megohms; plate resistor 146 for tube V8, 27k; resistor 147, 68k; resistor 149, 1 megohm; coupling condenser 148, 0.2 mf.; and cathode resistor 151 for tube V9, 220 ohms.

To continue the foregoing example, the vacuum tubes V10 and V11 were known by manufacturers' specifications as numbers 12AT7. The various capacitors, resistors and inductances had values as follows: resistor 156, 22k; resistor 157, 4.7 megohms; capacitor 158, 0.001 mf.; resistor 159, 220 ohms. Fixed capacitor 153, 820 mmf.; variable capacitor 164, 150 mmf. (maximum); inductance 162 for tank circuit 161, 100 mh.; resistor 167 for tube V11, 47k; resistor 168, 2.2 megohms; capacitor 169, 150 mmf.; cathode resistor 171 for tube V11, 1k; inductance 173 for the tank circuit 172, 100 mh.; fixed capacitor 174, 820 mmf.; variable capacitor 176, 150 mmf. (maximum); resistor 165, 2.2k; capacitor 166, 20 mf.; capacitor 175, 0.0005 mf.; resistor 177, 4.7 megohms; resistor 178, 100k (maximum); and resistor 179, 1 megohm.

Continuing the foregoing example, the vacuum tubes V12, V13, V14 and V15 were likewise each number 12AT7. The diode D4 was a number 6AL5 tube. The values of the various capacitors and resistors associated with these tubes was as follows: resistor 182, 22k; capacitor 183, 0.05 mf.; resistor 184, 4.7 megohms; cathode resistor 187 for tube V12, 1k; plate resistor 188 for tube V12, 22k; resistor 189 connecting the plate of V12 and the cathode of diode D4 to ground, 15k; capacitor 190, 27 mmf.; resistor 191, 150k; variable resistor 192, 1 megohm (maximum); condenser 193, 0.01 mf.; resistor 194, 4.7 megohms; resistor 196, 1k; capacitor 197, 0.001 mf.; resistor 198, 22k; resistor 199, 10k; capacitor 201, 0.02 mf.; resistor 202, 4.7 megohms; cathode resistor 203 for tube V14, 1k; capacitor 204, 0.0004 mf.; plate resistor 206 for tube V14, 22k; resistor 207, 22k; capacitor 208, 0.1 mf.; resistor 209, 1 megohm; resistor 211, 270k; resistor 212, 22k; resistor 213, 4.7k; resistor 214, 2.2k; capacitor 216, 40 mf.

In the circuitry of FIGURE 7 lead 91 is shown connecting the output of amplifier 57 with the input of tube V1. Lead 152 connects the output of tube V9 with the gate 68. Lead 180 connects the plate or the output of tube V9 with the input of tube V12. Lead 217 connects the cathode of tube V15 to the blanking clamp 58.

Figure 11:
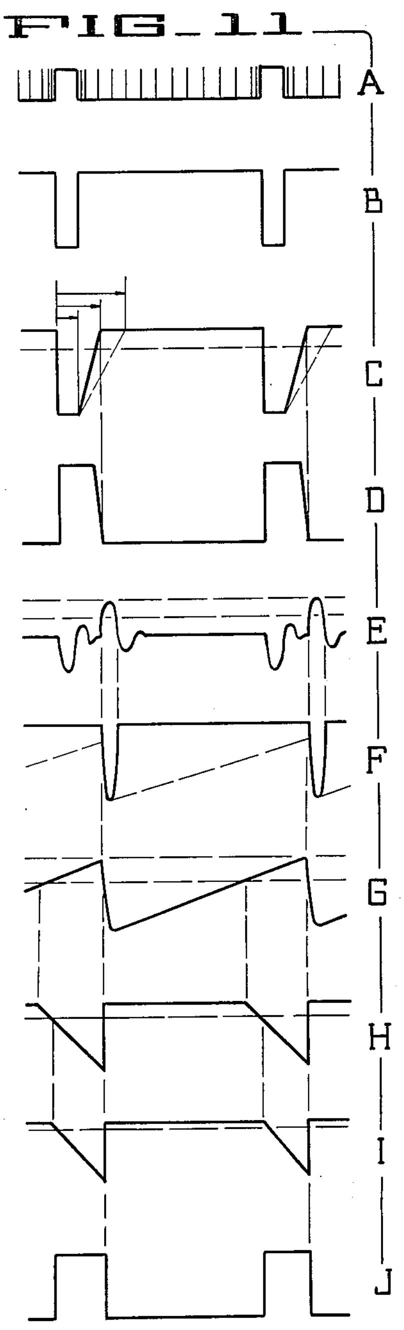

Operation of the blanking pulse generating means shown in FIGURE 7 is as follows: Tube V1 is biased to be normally non-conducting. Integrated vertical synchronizing pulses applied to the input of this tube from amplifier 57, appear at the control grid as pulses of approximately rectangular wave form. Diode D1 has its cathode directly connected to the plate of tube V1. When tube V1 becomes conducting as in the negative portion of wave 11B, it causes the cathode of diode D1 to become negative relative to its plate, whereby this diode conducts. When the diode D1 becomes conducting, capacitor 105 commences to charge to the voltage corresponding to the negative tip of wave 11B. The discharge current flows through the fixed resistor 106 and the adjustable resistor 107, this operation being seen in FIGURE 11C. The adjustable resistor 107 can be referred to as a vertical blanking position control, as will be presently explained. The voltage rise during discharge of the capacitor 105, as it appears at the plate of diode D1, is nearly linear. Capacitor 105 continues to discharge until the voltage on the plate of diode D1 equals the voltage on the plate of tube V1. Therefore, the wave form of the pulse generated by this circuit has a trailing edge that is delayed a predetermined amount, and this delay can be adjusted by adjusting the resistor 107. FIGURE 11B shows the wave form as it appears at the plate of tube V1, and FIGURE 11C shows the generated wave form as it appears on the grid of tube V2. The range of adjustment of the trailing edges of the wave forms, indicated in 11C, is obtained by the adjustment of resistor 107. The trailing edge of this wave form, at the base line, corresponds (with proper circuit adjustment) nearly with the end of the vertical blanking time in the final processed composite signal shown in FIGURE 9F.

Pulses having the wave form shown in FIGURE 11C are applied to tube V2, which is operated as a clipper, whereby the wave shown in FIGURE 11C is inverted and clipped along the cutoff line indicated in dotted lines in FIGURE 11C. The resulting square wave as it appears on the plate of tube V2, is shown in FIGURE 11D. Tube V3 is operated as an amplifier with a ringing circuit in its plate circuit. The ringing circuit may have a natural resonance frequency of the order of 1000 cycles per second. Its purpose is to provide positive pulses corresponding to the trailing edges of the square wave form shown in FIGURE 11D. Thus a wave form as illustrated in FIGURE 11E appears at the control grid of tube V4. Only the positive spike of this wave form, corresponding to the trailing edge of the wave shown in FIGURE 11D, is employed. The tube V4 is normally non-conducting, but application of the positive spike of the wave form shown in FIGURE 11E, makes it conducting whereby the wave form appearing at the plate of tube V4 is as shown in FIGURE 11F. In other words tube V4 becomes conducting at a time corresponding to the end of the vertical blanking. Capacitor 128 is charged and discharged in a manner similar to capacitor 105, diode D1, and associated resistors. The RC charging rate in this instance is so selected as to provide a saw-tooth wave form as shown in FIGURE 11G on the control grid of tube V5. The vertical trailing edge of the saw-tooth wave form corresponds with the leading edge of the wave form shown in FIGURE 11E, and the trailing edge of the square wave form shown in FIGURE 11D. The time duration of the saw-tooth wave form is determined by the time between the pulses derived from the ringing circuit (FIGURE 11E). Vacuum tube V5 is normally biased beyond cutoff whereby only the positive tip of the saw-tooth wave form will cause it to conduct. Therefore the wave form appearing on the plate of tube V5 is shown in FIGURE 11H. In other words it is a short duration pulse in a negative direction, having a shape like the tip of the saw-tooth wave form. The action of tube V5 together with the diode D3 and its RC circuitry causes clipping to occur along the dotted line of 11G. Cutoff of the next stage is shown by the dotted line of FIGURE 11I. After the resulting wave is amplified in vacuum tube V6, the wave form appearing on the plate of this tube is shown in FIGURE 11J. Note that the adjustment of the base line of the wave from that shown in FIGURE 11H, to that shown in FIGURE 11I, serves to adjust the base width of the wave form, and therefore the width of the square wave form shown in FIGURE 11J. This adjustment is accomplished by adjusting the value of the variable resistor 135. Such an adjustment serves to vary the self biasing voltage of diode D3. Tube V7 functions as an amplifier and in tube V8 the generated vertical gating pulses are added to the generated horizontal gating pulses. Tube V9 functions as an amplifier to apply vertical and horizontal gating pulses to the gate 68.

The circuitry including tubes V1–V8 provides a highly stable means for providing gating pulses. Should a conventional multivibrator be used for generating the vertical wave, the vertical gating pulses would be subject to substantial drift. For example, with a video system as described, a multivibrator may well be subject to changes (due to variations in RC constant, tube characteristics, voltages, etc.) resulting in a drift in the vertical gating pulses amounting to 25 horizontal lines, which would be intolerable. With the circuit described it is possible to provide a delay of 240 lines, within an accuracy of ±¼ line, substantially independent of power supply voltage and, more important, of the instantaneous frequency of the incoming vertical synchronizing pulses. In this connection it is well-known that the vertical synchronizing frequency in most television systems may at any time be slightly different from the standard of 60 c.p.s.

Figure 12:
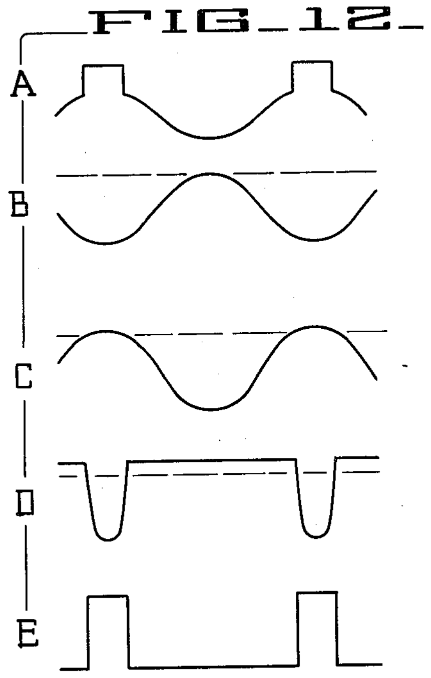

The horizontal gating generator consists of a locked oscillator formed by the vacuum tubes V10 and V11. Horizontal synchronizing pulses are applied with the feedback signal, to the control grid of V10 from the amplifier 69. The tank circuits 161 and 172 in the plate circuits of tubes V10 and V11, are resonant to the horizontal synchronizing pulse frequency, which in accordance with American standard practice is 15,750 c.p.s. FIGURE 12A illustrates the square wave horizontal synchronizing pulses plus the feedback signal as applied to the control grid of tube V10. As a result of the action of the resonant tank circuit 161, a sine wave is generated substantially as shown in FIGURE 12B. Its phase is closely synchronized with the horizontal synchronizing pulses. This sine wave is fed to the grid of tube V11. The negative tip of this wave is coincident with horizontal synchronizing pulse timing. The tube V11 provides phase inversion in its plate circuit, and forms a sine wave as shown in FIGURE 12C for application to the grid of tube V8. In tube V8 severe clipping occurs to form the waves shown in FIGURE 12D on the grid of tube V9 and further clipping in V9 to the level indicated, forms the square wave of FIGURE 12E in the plate of this tube.

The horizontal synchronizing gating pulse generator described above provides gating pulses that are not instantaneously dependent on the width or the timing of individual horizontal synchronizing pulses applied to its input. In addition, the circuit is relatively insensitive to noise pulses in the incoming video signal, because the driving signal for the generator comes from the output of the synchronizing gate. If for any reason there should be no incoming synchronizing signal, then the feedback voltage from tube V11 serves to maintain the generation of oscillations. This oscillator action together with the fact that the generator is locked with clean pulses, results in a very stable operation. This results from the use of tank circuits in the plate circuits of the tubes V10 and V11. Its operation responds only to the average timing of the input horizontal synchronizing pulses. The gate 68 is operated in such a manner that it discriminates against any noise or other components falling outside the proper synchronizing time. For example, if one synchronizing pulse is eliminated for any cause, from the video signal applied to amplifier 57, the gate 68 will continue to operate in a precisely timed manner. Noise spikes or other frequency components coming through the circuitry, not synchronous or coincident with the horizontal synchronizing pulse, will not be permitted to pass through the gate. The time interval for which the gate is open to pass a horizontal synchronizing pulse is determined by the width of the wave form shown in FIGURE 12E, and this in turn is controlled by an adjustment of the resistor 178. Adjustment of this resistor establishes the clipping level of the sine wave. The phase relationship of the horizontal gating pulses to horizontal synchronizing time, is varied or adjusted by varying the value of capacitor 176.

Figure 13:
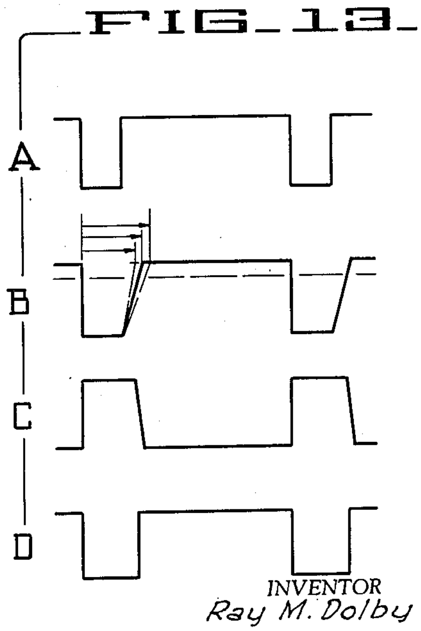

The circuitry associated with tubes V12–V15 can be described with reference to the wave forms FIGURES 13A–D, which show the development of the blanking pulses from the gating pulses. In practice, the circuits including tubes V12–15 serve to delay the trailing edge of the horizontal gating pulses by about 2 micro seconds. The necessity for this time delay is evident when FIGURE 10D, which shows the horizontal gating pulses, is compared with FIGURE 10B, showing the horizontal blanking pulses. Tube V12 functions in conjunction with the diode D4. FIGURE 13A shows the wave form of pulses on the plate of tube V12. Such pulses result from clipping and inversion of pulses applied to the control grid of this tube, from the plate of tube V9. FIGURE 13B shows the wave form applied to the control grid of tube V13. Note that the trailing edge of the pulse has been delayed a predetermined amount, the amount being adjusted by varying the resistor 192. The effect is similar to the functioning of diode D1, and involves the charging and discharging of the capacitor 190. Tube V13 is operated to effect clipping along the dotted line indicated in FIGURE 13B, whereby a nearly square wave form (FIGURE 13C) is applied to the grid of tube V14. This wave form is subjected to further clipping and amplification in tube V15, to produce the more accurate square wave form shown in FIGURE 13D, which is suitable for blanking. The width of each blanking pulse corresponds to the width of the blanking pedestal desired for the composite signal.

With respect to the clipping (black and white) and blanking means shown in FIGURE 8, in one particular instance the vacuum tube V16 was of a type known by manufacturer's specifications as No. 5687. CR1 was a number CR 1N279 crystal rectifier (i.e. crystal diode). CR2 was a number 1N279 crystal rectifier. CR3 and CR4 were number 1N279 crystal rectifiers. The various resistors and capacitors had values as follows: Resistor 221, 100k; resistor 222, 1.5k; resistor 224, 47k; resistor 226, 47k; resistor 227, 2k; capacitor 228, 80 mf; inductance 229, 36 mh.; resistor 231, 2.2*k*; resistor 236, 2.7k; capacitor 233, 0.05 mf.; capacitor 234, 0.25 mf.; resistor 232, 3.9 megohms; resistor 237, 27k; resistor 238, 5k; resistor 239, 1k; capacitor 240, 1k.

Operation of the circuit shown in FIGURE 8 is as follows: The composite transduced and integrated signal is applied to the grid of tube V16. The square wave form from amplifier 83 is applied to the cathode of the diode or crystal rectifier CR4. When the cathode of this diode goes negative, it becomes conductive and a direct current flows from the cathode of CR4, through the "black" clipping diode CR1 to the capacitor 228, and to the voltage divider network formed by resistors 224, 226 and 227. Diode CR1, in conjunction with the vacuum tube V16 provides clipping to a desired level on the black side of the video signal. Neither one of diodes CR1 or CR4 conducts, between blanking intervals, excepting however that CR1 conducts when there is a noise spike which goes more negative than the clipping level on the black side of the video information. Diode CR3 is biased to clip to a desired level upon the white side of the video information. Diode CR2 provides means for separating out synchronizing pulses from the composite video signal, for application to the synchronizing pulse amplifier 57 of FIGURE 6.

The circuit of FIGURE 8 has characteristics which make it desirable for use in the complete system. It permits precise clipping of the video portion of the signal, on both the black and white sides and such clipping can be adjusted by varying the resistors 227 and 238. Accurate reblanking is established by precisely formed blanking pulses and the blanking is on a level having a predetermined amount of set-up with respect to the video information. Thus the desired amount of set-up for the composite signal is maintained, and is not destroyed as in the usual black clipping methods to clean up the video signal.

As an alternative to the horizontal gate pulse amplifier 82 and pulse former 83, to which pulses are applied from gate 68, it is possible to employ a suitable oscillator controlled as to frequency by pulses from amplifier 57, and which provides controllable square wave pulses like the pulses generated at 83. Such an oscillator may be one of the multivibrator type. This arrangement offers certain advantages, as for example under very noisy signal conditions, and where the frequency of the incoming synchronizing pulses may not be precisely maintained at 15.75 kc.

I claim:

1. Means for blanking and clipping a composite video signal comprising: a vacuum tube having control grid, anode and cathode elements, said control grid being adapted to have a composite video signal applied thereto, said cathode being coupled to a point of reference potential, a source of anode voltage connected to said anode, a voltage divider network connected between said source of anode voltage and said point of reference potential, a first diode for clipping said composite signal having its anode connected to a point on said network, means for applying said composite video signal to said first diode coupled to said tube, means for applying a direct current bias to said diode whereby said diode conducts to clip on the black side of the video information, a second diode having its anode connected to the cathode of the first diode, means for applying blanking pulses to the cathode of the second diode to thereby cause both of said diodes to become conductive for a blanking interval, and means for deriving and utilizing an output signal from said first diode, said output signal comprising a composite video signal having a reformed blanking signal component that is accurately formed and noise free.

2. Means as in claim 1 with means for clipping the white side of the video information.

3. Means for modifying a composite video signal comprising: a first and second voltage divider network connected across a source of operating potential, a first diode having its anode connected to a point on said first divider network, a second diode having its anode connected to the cathode of said first diode, the cathode of said second diode being connected to a point on said second divider network, means for applying the composite video signal to the junction of said diodes, means coupled to said junction for deriving the modified composite video signal and for applying the composite signal to a utilization load, and means for applying blanking pulses comprising a third diode having its anode connected to said junction and its cathode connected to a source of blanking pulses.

4. A circuit for clipping and blanking a composite video signal having a video signal component and a synchronizing signal component comprising: means for deriving said composite video signal; a first diode having its cathode coupled to said composite signal deriving means; a second diode having its anode coupled to said composite signal deriving means; direct current biasing means coupled to the anode of said first diode and to the cathode of said second diode for maintaining precise clipping levels for signals applied to said diodes; means including a rectifying device for providing blanking signals coupled to said cathode of said first diode and to said anode of said second diode at a junction terminal; and a utilization load coupled between said junction terminal and said rectifying device so that a modified composite video signal having noise-free blanking pedestals appears at said load.

References Cited in the file of this patent

UNITED STATES PATENTS

| | | |
|---|---|---|
| 2,286,450 | White et al. | June 16, 1942 |
| 2,403,549 | Poch | July 9, 1946 |
| 2,517,808 | Sziklai | Aug. 8, 1950 |
| 2,539,774 | Gluyas | Jan. 30, 1951 |
| 2,550,178 | Wendt | Apr. 24, 1951 |
| 2,568,541 | Duke | Sept. 18, 1951 |
| 2,685,620 | Nixon | Aug. 3, 1954 |
| 2,698,875 | Greenwood | Jan. 4, 1955 |
| 2,730,575 | Hayden-Pigg | Jan. 10, 1956 |